United States Patent
Archer et al.

[15] 3,671,517

[45] June 20, 1972

[54] PREPARATION OF 2,3,4,5-TETRAHYDRO-5-PHEN-YL-1H-1,4-BENZODIAZEPINES AND INTERMEDIATES

[72] Inventors: Giles Allan Archer, 88 Fells Road, Essex Fells, N.J. 07021; Leo Henryk Sternbach, 10 Woodmont Road, Upper Montclair, N.J. 07043

[22] Filed: Dec. 17, 1970

[21] Appl. No.: 99,326

Related U.S. Application Data

[62] Division of Ser. No. 744,337, July 12, 1968, abandoned.

[52] U.S. Cl. ............... 260/239 BD, 260/570.5 R, 260/612 D, 260/650 R, 260/665 R, 260/665 G
[51] Int. Cl. ......................................................... C07d 53/06
[58] Field of Search ............................................ 260/239 BD

[56] References Cited

UNITED STATES PATENTS

| | | | |
|---|---|---|---|
| 3,244,698 | 4/1966 | Uskokovic et al. | 260/239 |
| 3,384,635 | 5/1968 | Carabateas et al. | 260/239 |

OTHER PUBLICATIONS

Ichii, J. Pharm. Soc. Japan, Vol. 82, pages 999– 1,004 (1964). RS1P45

*Primary Examiner*—Alton D. Rollins
*Attorney*—Samuel L. Welt, Jon S. Sax, Bernard S. Leon, William G. Isgro and Margaret C. Bogosian

[57] ABSTRACT

2,3,4,5-Tetrahydro-5-phenyl-1H-1,4-benzodiazepines are prepared from corresponding 5-desphenyl, 4,5-unsaturated benzodiazepines by treatment of the latter compounds with an organo metallic phenyl compound. The product compounds are useful as intermediates in the preparation of medicinally valuable 5-phenyl-2,3-dihydro-1H-1,4-benzodiazepines. Methods for preparing the 5-desphenyl, 4,5-unsaturated 1H-1,4-benzodiazepines are provided and intermediates useful in such preparation are identified.

2 Claims, No Drawings

PREPARATION OF 2,3,4,5-TETRAHYDRO-5-PHENYL-1H-1,4-BENZODIAZEPINES AND INTERMEDIATES

RELATED APPLICATIONS

This application is a divisional application of co-pending application, Ser. No. 744,337, filed July 12, 1968 and now abandoned.

BRIEF SUMMARY OF THE INVENTION

The present invention relates to a process for the preparation of compounds of the following formula:

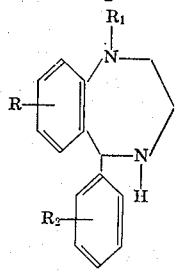

I where R is hydrogen, halogen, trifluoromethyl, lower alkyl and lower alkoxy, $R_1$ is lower alkyl and $R_2$ is hydrogen, halogen, lower alkyl and lower alkoxy wherein a compound of the following formula:

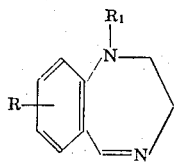

II where R and $R_1$ are as above
is reacted with an organo metallic phenyl compound of the following formula

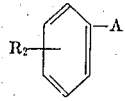

III where $R_2$ is as above and A is lithium, MgBr, MgCl or MgI.

The above reaction is conducted under conventional Grignard conditions. Suitable solvents to be used in the Grignard reaction are well known in the art and include ethers such as ethyl ether, tetrahydrofuran, dioxan and the like or hydrocarbons, preferably aromatic hydrocarbons such as benzene and mixtures thereof. The reaction conditions of temperature and pressure are not critical, although it is generally desirable to conduct the reaction at a temperature in the range of from about 0° to 200° C., preferably in the range from about 25° to 100° C. Selection of specific conditions will be governed by the identity of the solvent used and its freezing or boiling point. In a preferred embodiment of this invention, the organo metallic phenyl compound of Formula III is phenyl magnesium bromide.

In one preferred embodiment of the present invention compounds of formula I are prepared wherein R is a halogen group and is substituted at the 7-position of the benzodiazepine ring. Additionally, $R_1$ in a most preferred embodiment is a methyl group. Finally, $R_2$ is most preferably a hydrogen atom. In a most preferred embodiment R is chlorine substituted at the 7-position, $R_1$ is methyl and $R_2$ is hydrogen.

Compounds of Formula II above which are useful as intermediates in the preparation of compounds of Formula I above, are novel compounds and are therefore considered a part of the present invention. Compounds of Formula II may also be obtained in the form of their acid addition salts which may be prepared from the free base by procedures well known in the art. Suitable acids for the preparation of addition salts include both inorganic and organic acids such as the hydrohalic acids, e.g., hydrochloric acid and hydrobromic acid; nitric acid, sulfuric acid, phosphoric acid, formic acid, para-toluenesulfonic acid and the like.

Compounds of formula I above are readily converted into medicinally valuable 5-phenyl-2,3-dihydro-1H-1,4-benzodiazepines by treating the former compounds with a selective oxidizing agent so as to introduce a double bond in the 4,5-position. Suitable oxidizing agents for this purpose include manganese dioxide, ruthenium tetroxide, diethylazodicarboxylate, a quinone such as 2,3-dichloro-5,6-dicyanobenzoquinone, chloranil or an alkali metal hypohalite, such as an alkali metal hypoiodite, e.g., sodium hypoiodite. The reaction may be conveniently conducted in an organic solvent. For example, when manganese dioxide, diethylazodicarboxylate, a quinone or chloranil is used as the oxidizing agent the solvent may be selected from the group of aromatic hydrocarbons consisting of benzene, toluene, xylene and the like. When an alkali metal hypohalite is used, it is preferred to use a lower alkanol as the solvent. Ruthenium tetroxide oxidations are conducted preferably in chlorinated hydrocarbons such as chloroform, methylene chloride or carbon tetrachloride.

In general, there is no criticality attached to the selection of reaction conditions of temperature and pressure. When manganese dioxide, diethylazodicarboxylate, a quinone or a chloranil is employed, the temperature will generally be at or about the reflux temperature of the reaction medium. When an alkali metal hypohalite or ruthenium tetroxide is used it will generally be preferred to operate at or about room temperature.

The novel intermediates of Formula II above are readily prepared starting with a compound of the following formula:

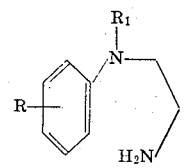

IV where R and $R_1$ are as above.

Compounds of Formula IV above are initially converted into a compound of formula V:

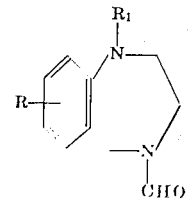

V where R and $R_1$ are as above
by treating the Formula IV compound with formaldehyde in formic acid at elevated temperatures. The reaction is conveniently carried out by initially adding the amine base of the Formula IV compound to the formic acid solution followed by adding aqueous formaldehyde and heating the reaction mixture at a temperature in the range of from about 25° to 250° C., most preferably in the range of from about 50° to 100° C.

In a particularly preferred aspect of this invention relating to compounds of Formula V, R is halogen and is substituted at the 7-position of the benzodiazepine ring. In a most preferred embodiment, R is chlorine located at the 7-position and $R_1$ is methyl, thus conforming to the compound 7-chloro-1,2,3,5-tetrahydro-1-methyl-4H-1,4-benzodiazepine-4-carboxaldehyde.

Compounds of Formula V above are then converted by hydrolysis to compounds of the following formula:

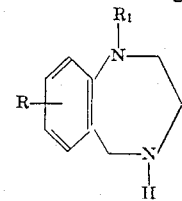

VI where R and $R_1$ are as above.

The hydrolysis reaction is most conveniently carried out in dilute aqueous acid or alkali. Suitable acids for this purpose include the hydrohalic acids, most preferably hydrochloric or hydrobromic acid and sulfuric acid. Alkalies useful for this hydrolysis include sodium hydroxide and potassium hydroxide. The reaction is most conveniently conducted at elevated temperatures, i.e., a temperature in the range of from about 25° to 200° C., most preferably in the range of from about 50° to 150° C. Compounds of Formula VI above are preferably isolated in the form of their acid addition salts. Such salts are obtained by treatment of the free base with a solution of the desired acid. Examples of suitable acid addition salts have previously been provided in the discussion of compounds of Formula II. A particularly suitable acid addition salt for the purposes of the present invention comprises the hydrochloride salts.

In a particularly preferred embodiment thereof, R is halogen and is located at the 7-position of the benzodiazepine ring. In a most preferred embodiment, R is chlorine and $R_1$ is methyl, i.e., 7-chloro-2,3,4,5-tetrahydro-1-methyl-1H-1,4-benzodiazepine.

Compounds of Formula VI may be directly converted into compounds of Formula II by treatment of the former compounds with an oxidizing agent. Suitable oxidizing agents include manganese dioxide, ruthenium tetroxide, diethylazodicarboxylate, quinones such as 2,3-dichloro-5,6-dicyano-1,4-benzoquinone, chloranil or alkali metal hypohalites, e.g., sodium hypochlorite.

The reaction conditions and solvents for this oxidation reaction are the same as previously described for these reagents.

In an alternative reaction pathway, compounds of Formula VI are initially converted into compounds of the following formula:

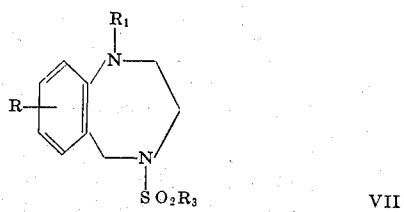

VII where R and $R_1$ are as above and $R_3$ is alkyl and aryl. The compounds of Formula VII are prepared by treating a compound of Formula VI with a desired sulfonyl halide, e.g., a lower alkylsulfonyl halide such as methanesulfonyl chloride or an arylsulfonyl halide such as p-toluenesulfonyl halide, e.g., p-toluenesulfonyl chloride in a solvent such as pyridine. The reaction may be conveniently conducted at temperatures from room temperature to the reflux temperature of the solvent.

The compounds of Formula VII are novel intermediates and are considered part of the present invention. In a preferred aspect thereof, R is halogen and is substituted at the 7-position. In a most preferred embodiment, R is chlorine and $R_1$ is methyl. Examples of preferred embodiments of compounds of Formula VII include 7-chloro-2,3,4,5-tetrahydro-4-methylsulfonyl-1-methyl-1H-1,4-benzodiazepine and 7-chloro-2,3,4,5-tetrahydro-4-p-tolylsulfonyl-1H-1,4-benzodiazepine.

The compounds of Formula VII are readily converted into compounds of Formula VI by reacting the former compounds with sodium hydride. This reaction is most conveniently carried out in an anhydrous organic solvent, such as for example, N,N-dimethylformamide or dimethylsulfoxide. Reaction conditions include a temperature in the range of from about 0° to 200° C., most preferably a temperature of about room temperature is employed.

The various preparative routes described above can be more readily understood by reference to the following reaction scheme wherein the meanings of A, X, R, $R_1$, $R_2$ and $R_3$ are as above throughout.

Reaction scheme

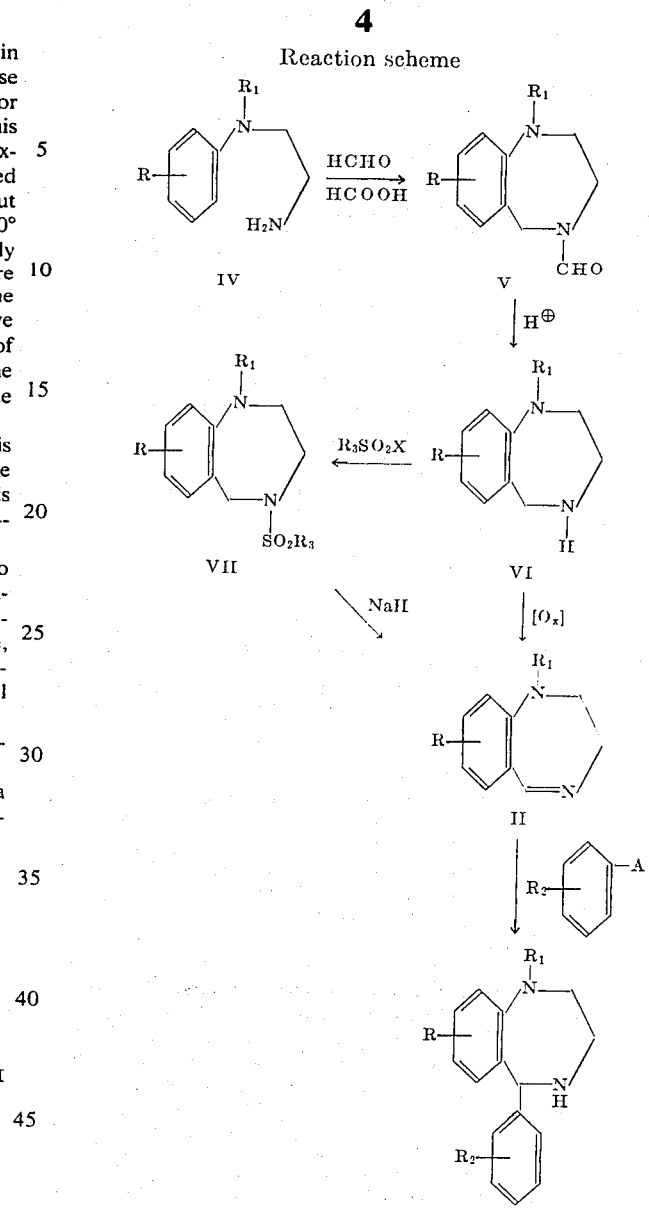

The term "halogen" as used herein is meant to include all four halogen forms, i.e., chlorine, fluorine, bromine, and iodine. The term "lower alkyl" as utilized herein includes both straight and branched chain hydrocarbon radicals containing from one to seven, most preferably one to four carbon atoms. Examples of such lower alkyl groups include methyl, ethyl, propyl, isopropyl and the like. The term "lower alkoxy" includes groups such as methoxy, ethoxy, propoxy and the like.

The following examples are illustrative but not limitative of the invention. All temperatures are stated in degrees Centigrade and all melting points are corrected.

EXAMPLE 1

Preparation of 7-chloro-1,2,3,5-tetrahydro-1-methyl-4H-1,4-benzodiazepine-4-carboxaldehyde N-(p-chlorophenyl)-N-methylethylenediamine (100 gm.) was added slowly to formic acid (100 ml.), with cooling in an ice bath, followed by the addition of 37 percent (w/v) aqueous formaldehyde (45 ml.). The reaction mixture was heated at 95° for 60 hours, and was then cooled and poured into a mixture of excess aqueous 3 N-sodium hydroxide, ice and ether. The ether layer was separated, washed successively with water, N-hydrochloric acid, water, dilute sodium bicarbonate 258°and water, dried over magnesium sulfate, and evaporated. The residue was crystallized from prisms, to give the above-captioned product of m.p. 89°-90°. The analysis sample was recrystallized from hexane as colorless plates, m.p. 90°-91°.

EXAMPLE 2
Preparation of 7-chloro-2,3,4,5-tetrahydro-1-methyl-1H-1,4-benzodiazepine hydrochloride A mixture of 7-chloro-1,2,3,5-tetrahydro-1-methyl-1H-1,4-benzodiazepine-4-carboxaldehyde (4.5 gm.) and aqueous 18 percent (w/v) hydrochloric acid (45 ml.) was heated at 95° for 1 hour, then cooled and poured into excess dilute sodium hydroxide solution. The precipitated product was recovered by extraction with ether, and converted into the hydrochloride by treatment with excess methanolic hydrogen chloride. Recrystallization from methanol gave the above-captioned product of m.p. 158°–260° The analysis sample was crystallized from methanol as colorless prisms, m.p. 260°–261°.

EXAMPLE 3
Preparation of 7-chloro-2,3,4,5-tetrahydro-4-methylsulfonyl-1-methyl-1H-1,4-benzodiazepine To a stirred solution of 7-chloro-2,3,4,5-tetrahydro-1-methyl-1H-1,4-benzodiazepine hydrochloride (1.8 gm.) in anhydrous pyridine (15 ml.) was added methanesulfonyl chloride (1.25 gm.) dropwise during 15 minutes. After stirring overnight at room temperature, the mixture was poured into ice-water, and the precipitated product was recovered by filtration. Recrystallization from methylene chloride-hexane afforded the above-captioned product of m.p. 118°–120°. The analysis sample was recrystallized from methylene chloride-hexane as yellow prisms, m.p. 119°–120°.

EXAMPLE 4
Preparation of 7-chloro-2,3,4,5-tetrahydro-4-p-tolylsulfonyl-1H-1,4-benzodiazepine To a solution of 7-chloro-2,3,4,5-tetrahydro-1-methyl-1H-1,4-benzodiazepine hydrochloride (4.75 gm.) in anhydrous pyridine (20 ml.) was added dropwise a solution of p-toluenesulfonyl chloride (5.75 gm.) in anhydrous pyridine (20 ml.). The reaction mixture was refluxed for 3 hours, then cooled and poured into ice water. The precipitated product was recovered by filtration, and recrystallized from methylene chloride-hexane, to give the above-captioned product of m.p. 137°–138°. The analysis sample was recrystallized from benzene as colorless prisms, m.p. 138°–139°.

EXAMPLE 5
Preparation of 7-chloro-2,3-dihydro-1-methyl-1H-1,4-benzodiazepine hydrochloride METHOD A. Oxidation of 7-chloro-2,3,4,5-tetrahydro-1-methyl-1H-1,4-benzodiazepine hydrochloride A mixture of activated manganese dioxide (Sterwin Chemical Co.) (170 gm.) and benzene (1,700 ml.) was refluxed under a Dean-Stark trap until no further water was collected in the latter (ca. 1 hour). A solution of the above tetrahydro compound (17 gm.) in benzene (200 ml.) was added during 15 minutes, and refluxing was continued for a further 10 hours. After cooling, the inorganic residue was removed by filtration, and thoroughly washed with benzene. Evaporation of the filtrates gave the crude product, which was dissolved in ether, and extracted with aqueous N-acetic acid. The extracts were made basic with aqueous sodium hydroxide, and the product was recovered by extraction with methylene chloride. Further purification was achieved by chromatography of a benzene solution of the product, on a column of Woelm Activity III neutral alumina (150 gm.). The benzene eluate afforded the product as the free base on evaporation, which was converted into the above-captioned product hydrochloride by treatment with excess methanolic hydrogen chloride and ether. The analysis sample was recrystallized from methanol-ether as yellow prisms, m.p. 227°–230°.

METHOD B. Oxidation with diethyl azodicarboxylate

A mixture of 7-chloro-2,3,4,5-tetrahydro-1-methyl-1H-1,4-benzodiazepine hydrochloride (1.04 gm.) in benzene (10 ml.) was refluxed for 6 hours. After cooling overnight, the precipitate of diethylhydrazinodicarboxylate was removed by filtration. Evaporation of the filtrate gave the free base of the above-captioned product as identified with the authentic material by thin layer chromatography.

METHOD C. Oxidation with 2,3-dichloro-5,6-dicyano-1,4-benzoquinone (DDQ)

A solution of 7-chloro-2,3,4,5-tetrahydro-1-methyl-1H-1,4-benzodiazepine hydrochloride (1 gm.) in dry benzene (50 ml.) was treated with a solution of DDQ (1.4 gm.) in dry benzene (50 ml.). The mixture was refluxed for 1 hour, then cooled and filtered. The residue was stirred with a mixture of aqueous N-potassium hydroxide and methylene chloride; the organic extract was washed with water, dried (magnesium sulfate) and evaporated, to give the crude product, which was purified by chromatography on 2-mm. thick plates of silica gel F-254 (E. Merck), by development with chloroform-methanol (1:1). The areas containing product were identified by examination under ultraviolet light (254 m$\mu$), and were scraped off and extracted with a mixture of ethanol and saturated aqueous sodium bicarbonate. Concentration of the extract, followed by extraction with methylene chloride, afforded product as the free base which was converted into the above-captioned product hydrochloride as described in method A. Recrystallization from methanol-ether gave yellow prisms, m.p. 227°–230°, identical with the authentic compound (method A) by comparison of melting points, which were underpressed in a mixed melting point determination.

METHOD D. Treatment of 7-chloro-2,3,4,5-tetrahydro-4-methylsulfonyl-1-methyl-1H-1,4-benzodiazepine with sodium hydride To a solution of the above tetrahydro compound (0.3 gm.) in anhydrous N,N-dimethylformamide (30 ml.) was added 53 percent (w/v) sodium hydride in mineral oil (0.1 gm.), and the mixture was stirred under dry nitrogen for 5 days, followed by pouring it into ice water. The product, as the free base, was recovered by extraction with methylene chloride, and identified with an authentic sample of the above-captioned product free base by thin layer chromatography.

METHOD E. Treatment of 7-chloro-2,3,4,5-tetrahydro-4-p-tolylsulfonyl-1-methyl-1H-1,4-benzodiazepine with sodium hydride Treatment of the above tetrahydro compound with sodium hydride in N,N-dimethylformamide, in the manner described in method D, afforded the above-captioned product as the free base which was identified with an authentic sample by thin-layer chromatography.

EXAMPLE 6
Preparation of 7-chloro-2,3,4,5-tetrahydro-1-methyl-5-phenyl-1H-1,4-benzodiazepine To a solution of 7-chloro-2,3-dihydro-1-methyl-1H-1,4-benzodiazepine (0.311 gm.) in anhydrous tetrahydrofuran (20 ml.) was added a 2.2 M-solution of phenylmagnesium bromide in ether (10 ml.) dropwise during 15 minutes. The mixture was heated at 60° for 8 hours, then cooled and poured into a mixture of excess ammonium chloride, ice and ether. The crude product was recovered by making the mixture basic with sodium carbonate, followed by extraction with ether. The ether solution was extracted with aqueous N-hydrochloric acid, and this acid layer was then made basic with sodium hydroxide solution, and extracted with ether. The extract was washed with water, dried over magnesium sulfate, and evaporated, to give the above-captioned product as an oil. Crystallization from pentane afforded colorless crystals, m.p. 74°–75 identical with an authentic sample by comparison of melting points and infrared spectra. Treatment with excess methanolic hydrogen chloride and ether gave the hydrochloride m.p. 248°–249°, identical with an authentic sample by comparison of melting points and infrared spectra.

We claim:

1. Compounds of the formula:

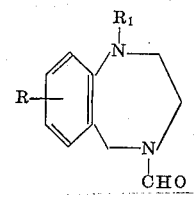

where R is halogen and $R_1$ is lower alkyl.

2. The compound of claim 1 wherein R is chlorine substituted on the 7-position of the ring and $R_1$ is methyl, i.e., 7-chloro-1,2,3,5-tetrahydro-1-methyl-4H-1,4-benzodiazepine-4-carboxaldehyde.

* * * * *

PO-1050
(5/69)

UNITED STATES PATENT OFFICE
CERTIFICATE OF CORRECTION

Patent No. 3,671,517              Dated 6/20/72

Inventor(s) Archer, Giles Allan and Sternbach, Henryk

It is certified that error appears in the above-identified patent and that said Letters Patent are hereby corrected as shown below:

Column 1, following the title at about line 4,

"Jiles A. Archer, Essex Fells, and Henryk Sternbach, Upper Montclair, New Jersey."

should be

Jiles A. Archer, Essex Fells, and Henryk Sternbach, Upper Montclair, New Jersey, assignors to Hoffmann La-Roche Inc., Nutley, N.J.

Signed and sealed this 15th day of August 1972.

(SEAL)
Attest:

EDWARD M. FLETCHER, JR.
Attesting Officer

ROBERT GOTTSCHALK
Commissioner of Patents